(12) United States Patent
Kang et al.

(10) Patent No.: US 10,699,848 B2
(45) Date of Patent: *Jun. 30, 2020

(54) MULTILAYER CERAMIC ELECTRONIC COMPONENT

(71) Applicant: SAMSUNG ELECTRO-MECHANICS CO., LTD., Suwon-si, Gyeonggi-do (KR)

(72) Inventors: Sim Chung Kang, Suwon-si (KR); Eun Jung Lee, Suwon-si (KR); Ki Pyo Hong, Suwon-si (KR); Yong Park, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,771

(22) Filed: Oct. 22, 2018

(65) Prior Publication Data

US 2020/0075253 A1   Mar. 5, 2020

(30) Foreign Application Priority Data

Sep. 5, 2018  (KR) .................. 10-2018-0106001

(51) Int. Cl.
*H01G 4/30*  (2006.01)
*H01G 4/12*  (2006.01)
*H01G 4/008* (2006.01)

(52) U.S. Cl.
CPC .............. *H01G 4/30* (2013.01); *H01G 4/008* (2013.01); *H01G 4/1227* (2013.01)

(58) Field of Classification Search
CPC ......... H01G 4/30; H01G 4/1227; H01G 4/008
See application file for complete search history.

(56) References Cited

U.S. PATENT DOCUMENTS

| | | | |
|---|---|---|---|
| 6,301,092 B1 | 10/2001 | Hata et al. | |
| 7,138,351 B2 | 11/2006 | Hong et al. | |
| 8,804,305 B2* | 8/2014 | Kim ................. | H01G 4/232 361/311 |
| 9,251,957 B2* | 2/2016 | Kim ................. | H01G 4/1209 |

(Continued)

FOREIGN PATENT DOCUMENTS

| | | | |
|---|---|---|---|
| JP | 2001-006966 A | | 1/2001 |
| KR | 20120043348 A | * | 5/2012 |

(Continued)

*Primary Examiner* — Nathan Milakovich
(74) *Attorney, Agent, or Firm* — Morgan, Lewis & Bockius LLP

(57) ABSTRACT

A multilayer ceramic electronic component includes: a ceramic body including a dielectric layer and first and second internal electrodes stacked to be alternately exposed to one side surface and the other side surface with the dielectric layer disposed therebetween; and first and second external electrodes disposed on an external surface of the ceramic body to be connected to the first and second internal electrodes, respectively, in which the ceramic body includes an area of overlap in a thickness direction of the first and second internal electrodes, margin region, and/or cover region, and the margin region in the width direction and/or the cover region includes a phosphoric acid-based second phase.

14 Claims, 11 Drawing Sheets

(56) References Cited

U.S. PATENT DOCUMENTS

| | | | | |
|---|---|---|---|---|
| 2004/0233612 A1* | 11/2004 | Sugimoto | ................ | H01G 4/12 |
| | | | | 361/312 |
| 2012/0162855 A1* | 6/2012 | Suh | ......................... | H01B 1/22 |
| | | | | 361/305 |
| 2014/0009864 A1 | 1/2014 | Takashima et al. | | |
| 2014/0146437 A1 | 5/2014 | Lee et al. | | |
| 2018/0040424 A1* | 2/2018 | Takahashi | ............. | C04B 35/495 |

FOREIGN PATENT DOCUMENTS

| | | |
|---|---|---|
| KR | 10-1771742 | 6/2014 |
| WO | 2012120712 A1 | 9/2012 |

\* cited by examiner

A - A'

S

MULTILAYER CERAMIC ELECTRONIC COMPONENT

CROSS-REFERENCE TO RELATED APPLICATION(S)

This application claims benefit of priority to Korean Patent Application No. 10-2018-0106001 filed on Sep. 5, 2018 in the Korean Intellectual Property Office, the disclosure of which is incorporated herein by reference in its entirety.

TECHNICAL FIELD

The present disclosure relates to a multilayer ceramic electronic component.

BACKGROUND

A multilayer ceramic electronic component has been widely used as an information technology (IT) component of a computer, a personal digital assistant (PDA), a cellular phone, and the like, since it has a small size, implements high capacitance, may be easily mounted, and has been widely used as an electrical component, and since it has high reliability and high strength characteristics.

Moistureproof reliability and hardness of a ceramic body included in the multilayer ceramic electronic component may deteriorate due to shrinkage after sintering of internal electrodes.

SUMMARY

An aspect of the present disclosure may provide a multilayer ceramic electronic component capable of improving moistureproof reliability and hardness depending on a physical crosslinking effect of a second phase and a low-temperature chemical sintering effect of a phosphoric acid type by including the second phase in a region (margin region and/or cover region in a width direction) closer to an outside than an internal electrode in a ceramic body.

According to an aspect of the present disclosure, a multilayer ceramic electronic component may include: a ceramic body including a dielectric layer and first and second internal electrodes stacked to be alternately exposed to one side surface and the other side surface with the dielectric layer disposed therebetween; and first and second external electrodes disposed on an external surface of the ceramic body to be connected to the first and second internal electrodes, respectively, in which the ceramic body includes an area of overlap in a thickness direction of the first and second internal electrodes and margin regions in a width direction, located on one side and the other side in a width direction of the area of overlap, and the margin regions in the width direction include a phosphoric acid-based phase.

According to another aspect of the present disclosure, a multilayer ceramic electronic component may include: a ceramic body including a dielectric layer and first and second internal electrodes stacked to be alternately exposed to one side surface and the other side surface with the dielectric layer disposed therebetween; and first and second external electrodes disposed on an external surface of the ceramic body to be connected to the first and second internal electrodes, respectively, in which the ceramic body includes an area of overlap in a thickness direction of the first and second internal electrodes and cover regions located on one side and the other side of the area of overlap in a thickness direction, and the cover regions include a phosphoric acid-based second phase.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
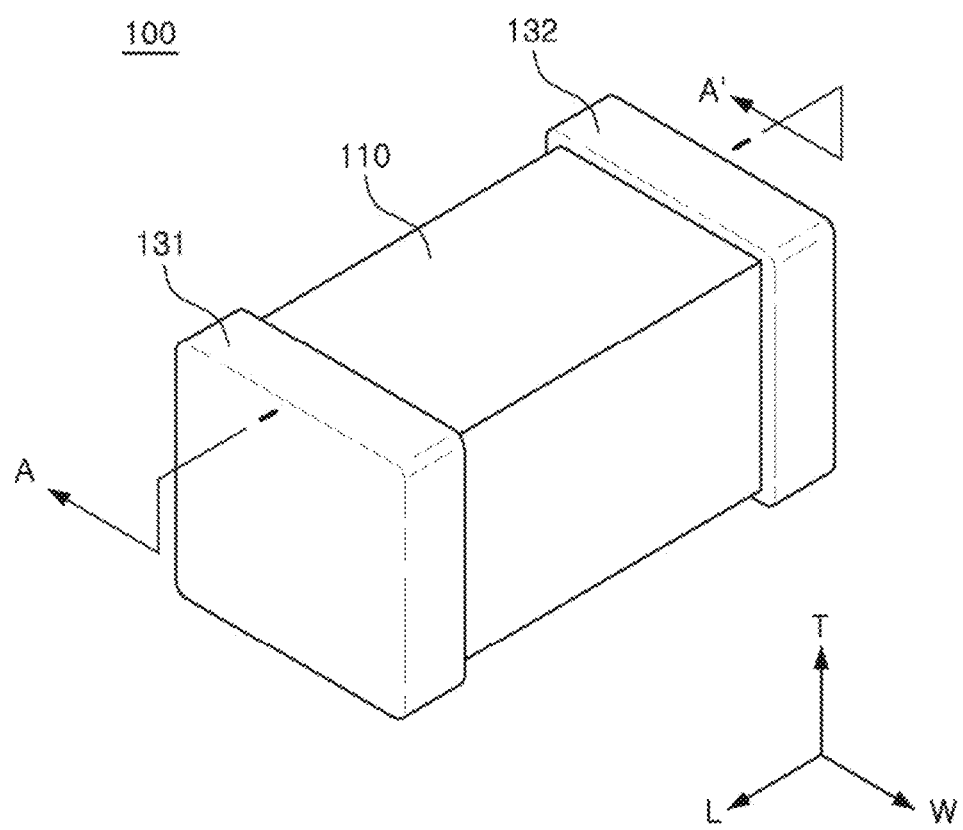
FIG. 1 is a perspective view showing a multilayer ceramic electronic component according to an exemplary embodiment of the present disclosure.
Figure 2:
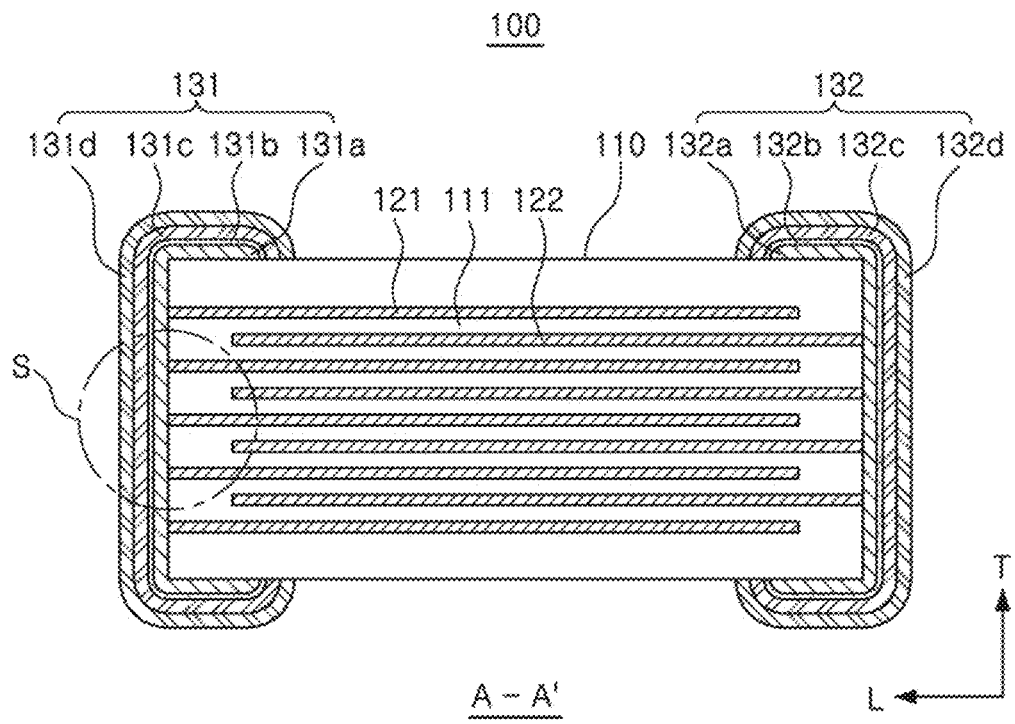
FIG. 2 is a cross-sectional view taken along line A-A' of FIG. 1.
Figure 3:
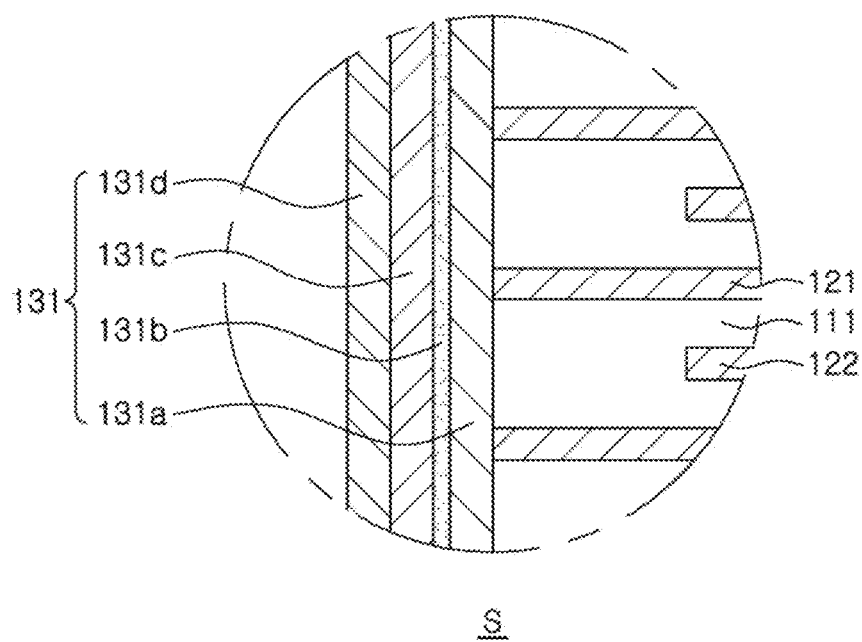
FIG. 3 is an enlarged view of region S of FIG. 2.

FIG. 1 is a perspective view showing a multilayer ceramic electronic component according to an exemplary embodiment of the present disclosure, FIG. 2 is a cross-sectional view taken along line A-A' of FIG. 1, and FIG. 3 is an enlarged view of region S of FIG. 2.

Referring to FIGS. 1 through 3, a multilayer ceramic electronic component 100 according to an exemplary embodiment of the present disclosure may include a ceramic body 110 and first and second external electrodes 131 and 132.

The ceramic body 110 may be formed in a hexahedron having both side surfaces in a length direction L, both side surfaces in a width direction W, and both side surfaces in a thickness direction T. The ceramic body 110 may be formed by stacking a plurality of dielectric layers 111 in the thickness direction T and then sintering the plurality of dielectric layers 111. A shape and a dimension of the ceramic body 110 and the number (one or more) of stacked dielectric layers 111 are not limited as shown in the exemplary embodiment of the present disclosure.

The plurality of dielectric layers 111 disposed in the ceramic body 110 may be in a sintered state. Adjacent dielectric layers 111 may be integrated with each other so that boundaries therebetween are not readily apparent without using a scanning electron microscope (SEM).

For example, the ceramic body 110 may be formed in a hexahedron having eight rounded vertexes. Accordingly, durability and reliability of the ceramic body 110 may be improved, and structural reliability of the first and second external electrodes 131 and 132 at the corners may be improved.

A thickness of the dielectric layer 111 may be arbitrarily changed in accordance with a capacity design of the multilayer ceramic capacitor 100, and the dielectric layer 111 may include high-k ceramic powders, for example, barium titanate ($BaTiO_3$) based powders or strontium titanate ($SrTiO_3$) based powders. However, the material of the dielectric layer 111 is not limited thereto. In addition, for the purpose of the present disclosure, various ceramic additives, organic solvents, plasticizers, binders, dispersants and the like may be added to the ceramic powders.

An average particle size of the ceramic powder used to form the dielectric layer 111 is not particularly limited, but may be adjusted in order to accomplish an object of the present disclosure. For example, the average particle size of the ceramic powder may be adjusted to be 400 nm or less. Accordingly, the multilayer ceramic electronic component 100 according to the exemplary embodiment of the present disclosure may be used as a part greatly demanding miniaturization and high capacity like IT parts.

For example, the dielectric layer 111 may be formed by applying slurry formed of a powder, such as barium titanate ($BaTiO_3$), to a carrier film and drying the slurry to prepare a plurality of ceramic sheets. The ceramic sheet may be manufactured by mixing the ceramic powder, the binder, and the solvent to produce a slurry and producing the slurry in a sheet form having a thickness of several μm by a doctor blade method, but the manufacturing method of the ceramic sheet is not limited thereto.

First and second internal electrodes 121 and 122 may have at least one first internal electrode 121 and at least one second internal electrode 122 having different polarities from each other and may be formed to have a predetermined thickness with the plurality of dielectric layers 111 stacked in the thickness direction T of the ceramic body 110 disposed therebetween.

The first internal electrode 121 and the second internal electrode 122 may be formed by printing a conductive paste including a conductive metal so as to be alternately exposed to one side and the other side in the length direction L of the ceramic body 110 along a stacked direction of the dielectric layer 111 and may be electrically insulated from each other by the dielectric layer 111 disposed therebetween.

That is, the first and second internal electrodes 121 and 122 may be electrically connected to respectively the first and second external electrodes 131 and 132 formed on both side surfaces in the length direction of the ceramic body 110 through the parts alternately exposed to both side surfaces in the length direction of the ceramic body 110.

For example, the first and second internal electrodes 121 and 122 may be formed of a conductive paste for internal electrodes including a conductive metal powder having an average particle size of 0.1 to 0.2 μm and 40 to 50% by weight, but the first and second internal electrodes 121 and 122 are not necessarily formed as described above.

The conductive paste for the internal electrodes may be applied on the ceramic sheet by a printing method or the like to form an internal electrode pattern. As a method of printing the conductive paste, a screen printing method, a gravure printing method or the like may be used. However, the method of printing the conductive paste is not limited thereto. The ceramic sheet on which the internal electrode pattern is printed may be stacked by 200 to 300 layers and then compressed and sintered to manufacture the ceramic body 110.

Therefore, if a voltage is applied to the first and second external electrodes 131 and 132, charges may be accumulated between the first and second internal electrodes 121 and 122 facing each other. In this case, the capacitance of the multilayer ceramic capacitor 100 may be in proportion to an area of a region in which the first and second internal electrodes 121 and 122 overlap each other.

That is, when the area of the region in which the first and second internal electrodes 121 and 122 overlap each other is as large as possible, the capacitance may be as large as possible even in capacitors of the same size.

An average thickness of each of the first and second internal electrodes 121 and 122 may be determined depending on the usage, and may be, for example, 0.4 μm or less. In addition, the number of first and second internal electrodes 121 and 122 may be 400 layers or more. Accordingly, the multilayer ceramic electronic component 100 according to the exemplary embodiment of the present disclosure may be used as a part greatly demanding miniaturization and high capacity like IT parts.

An average thickness of the dielectric layer 111 may be determined depending on the usage, and may be, for example, 0.4 μm or less. Since the thickness of the dielectric layer 111 corresponds to a gap between the first and second internal electrodes 121 and 122, the capacitance of the multilayer ceramic electronic component 100 may be increased as the thickness of the dielectric layer 111 is decreased.

Meanwhile, the conductive metal included in the conductive paste forming the first and second internal electrodes 121 and 122 may be formed of nickel (Ni), copper (Cu), palladium (Pd), silver (Ag), lead (Pb), platinum (Pt) or the like, alone or an alloy thereof. However, the conductive metal is not limited thereto.

Each of the first and second external electrodes 131 and 132 may be disposed on an external surface of the ceramic body 110 so as to be connected to the first and second internal electrodes 121 and 122, and may be configured to electrically connect between the first and second internal electrodes 121 and 122 and a substrate.

Each of the first and second external electrodes 131 and 132 may include first and second plating layers 131c and 132c for at least some of structural reliability, easiness of mounting on a substrate, durability against the outside, heat resistance, and equivalent series resistance (ESR).

For example, the first and second plating layers 131c and 132c may be formed by sputtering or electrolytic deposition. However, the first and second plating layers 131c and 132c is not necessarily formed as described above.

For example, the first and second plating layers 131c and 132c may contain the most nickel, and first and second plating layers 131c and 132c may be formed of copper (Cu), palladium (Pd), platinum (Pt), gold (Au), silver (Ag) or lead (Pb) or the like, alone or an alloy thereof without limitation.

Meanwhile, each of the first and second external electrodes 131 and 132 may further include first and second base electrode layers 131a and 132a which are disposed between the first and second internal electrodes 121 and 122 and the first and second plating layers 131c and 132c, and at least partially contact the outside of the ceramic body 110.

The first and second base electrode layers 131a and 132a may be easily coupled to the first and second internal electrodes 121 and 122 relative to the first and second plating layers 131c and 132c, such that a contact resistance to the first and second internal electrodes 121 and 122 may be reduced.

The first and second base electrode layers 131a and 132a may be disposed in the inner regions of the first and second plating layers 131c and 132c in the first and second external electrodes 131 and 132.

For example, the first base electrode layer 131a may be covered with the first plating layer 131c and first conductive resin layer 131b so as not to be exposed to the outside of the multilayer ceramic electronic component 100, and the second base electrode layer 132a may be covered with the second plating layer 132c and second conductive resin layer 132b so as not to be exposed to the outside of the multilayer ceramic electronic component 100.

For example, the first and second base electrode layers 131a and 132a may be formed by a method of dipping a paste including a metal component or a method of printing a conductive paste including a conductive metal on at least one surface in the thickness direction T of the ceramic body 110, and may also be formed by a sheet transfer method and a pad transfer method.

For example, the first and second base electrode layers 131a and 132a may be formed of copper (Cu), nickel (Ni), palladium (Pd), platinum (Pt), gold (Au), silver (Ag), lead (Pb) or the like, alone or an alloy thereof.

The first and second external electrodes 131 and 132 may further include first and second conductive resin layers 131b and 132b which are disposed between the first base electrode layer 131a and the first plating layer 131c and between the second base electrode layer 132a and the second plating layer 132c, respectively.

Since the first and second conductive resin layers 131b and 132b have relatively higher flexibility than the first and second plating layers 131c and 132c, the first and second conductive resin layers 131b and 132b may protect external physical impact or bending impact of the multilayer ceramic electronic component 100 and prevent the external electrode from being cracked by absorbing a stress or a tensile stress applied upon being mounted on the substrate.

For example, the first and second conductive resin layers 131b and 132b may have a structure in which conductive particles such as copper (Cu), nickel (Ni), palladium (Pd), gold (Au), silver (Ag) and lead (Pb) are included in a resin having high flexibility such as a glass and an epoxy resin, and thus may have high flexibility and high conductivity.

The first and second external electrodes 131 and 132 may further include first and second tin plating layers 131d and 132d disposed on external surfaces of the first and second plating layers 131c and 132c, respectively. The first and second tin plating layers 131d and 132d may further improve at least some of structural reliability, easiness of mounting on the substrate, durability against the outside, heat resistance, and equivalent series resistance value.

FIGS. 4A through 4G are diagrams showing various distributions of a second phase of the multilayer ceramic electronic component according to the exemplary embodiment of the present disclosure.

Figure 4A:
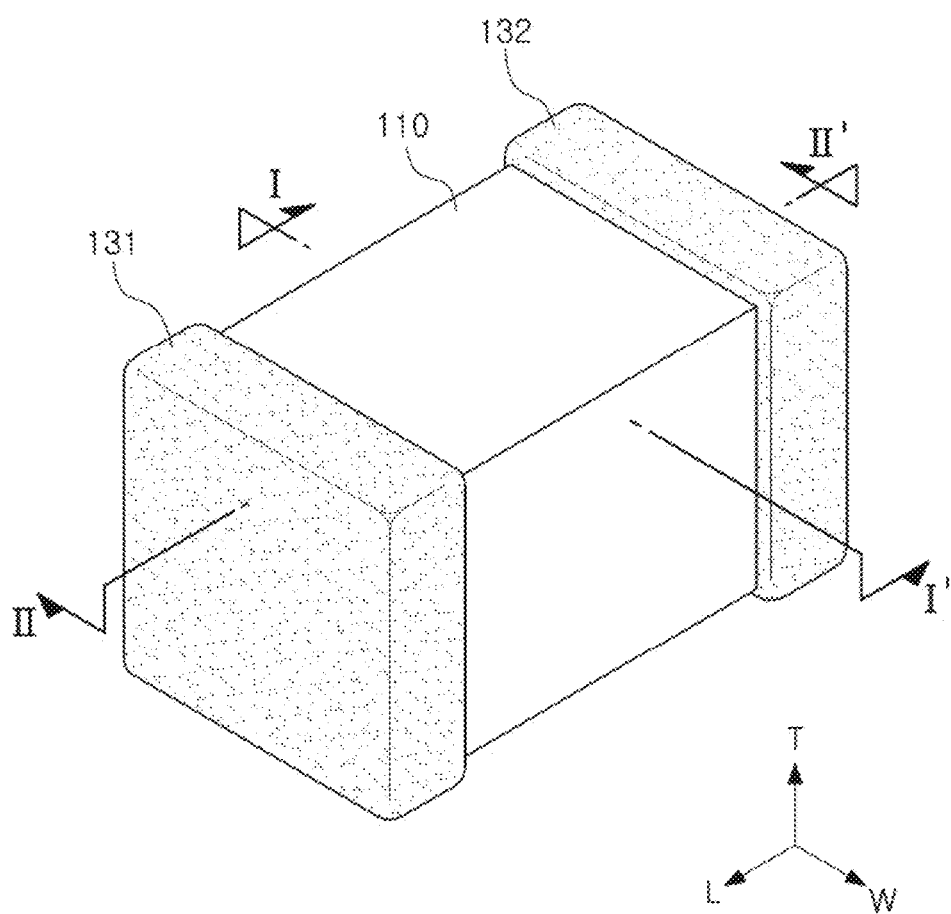
FIGS. 4A through 4G are diagrams showing various distributions of a second phase of the multilayer ceramic electronic component according to the exemplary embodiment of the present disclosure.
Figure 4B:
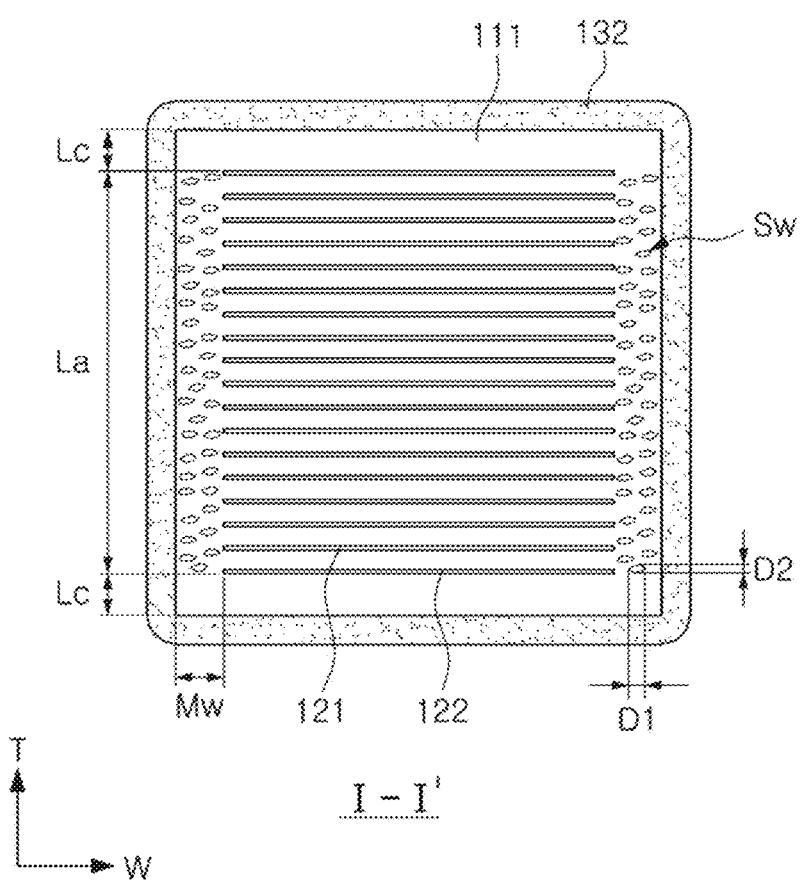
Figure 4C:
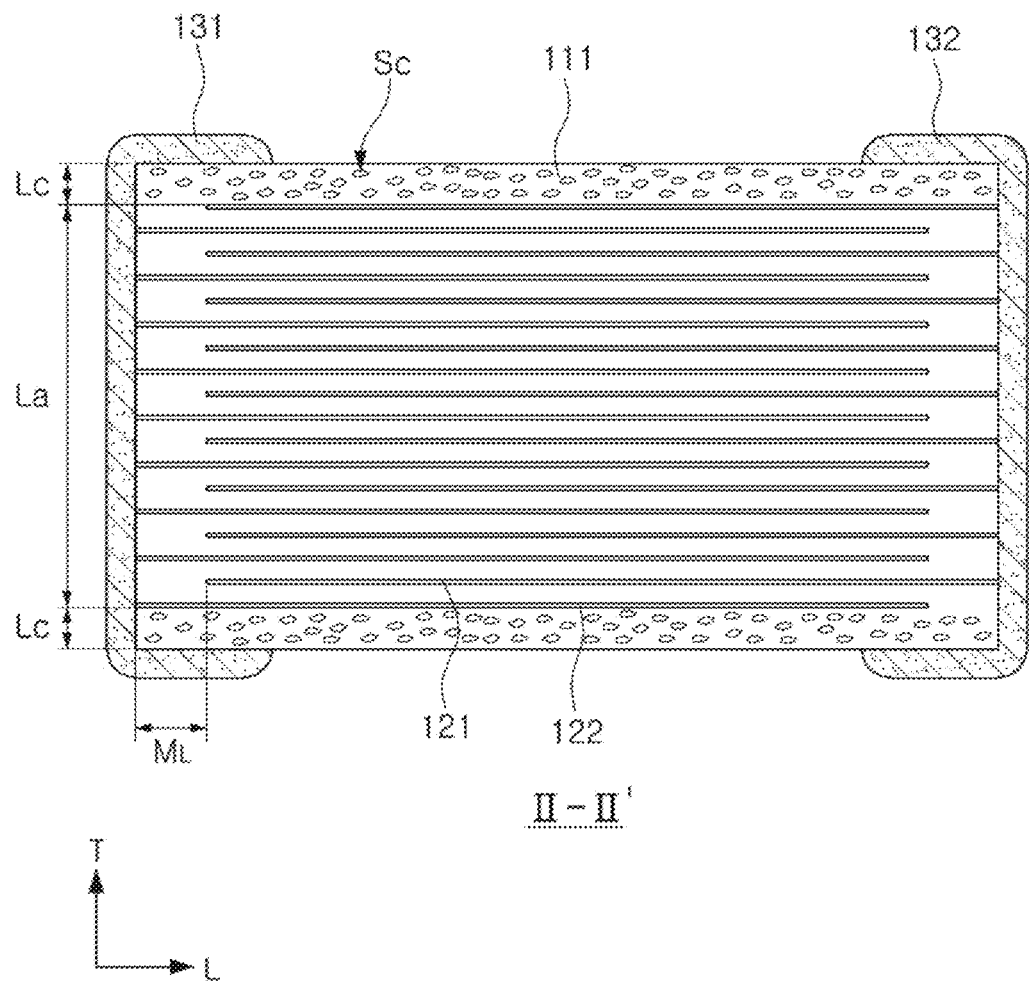
Figure 4D:
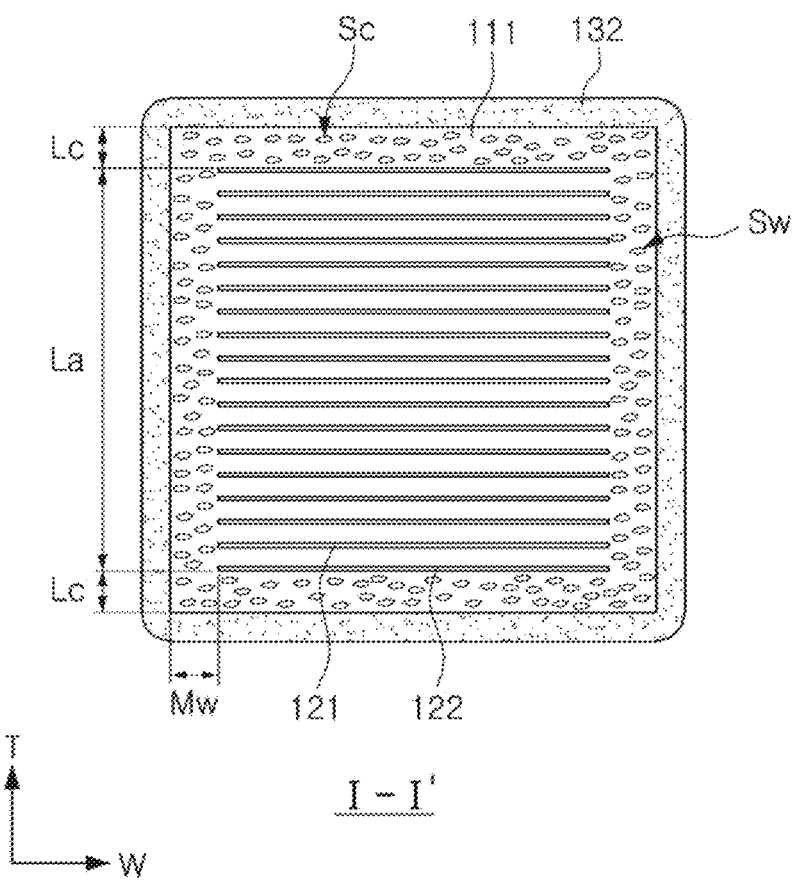
Figure 4E:
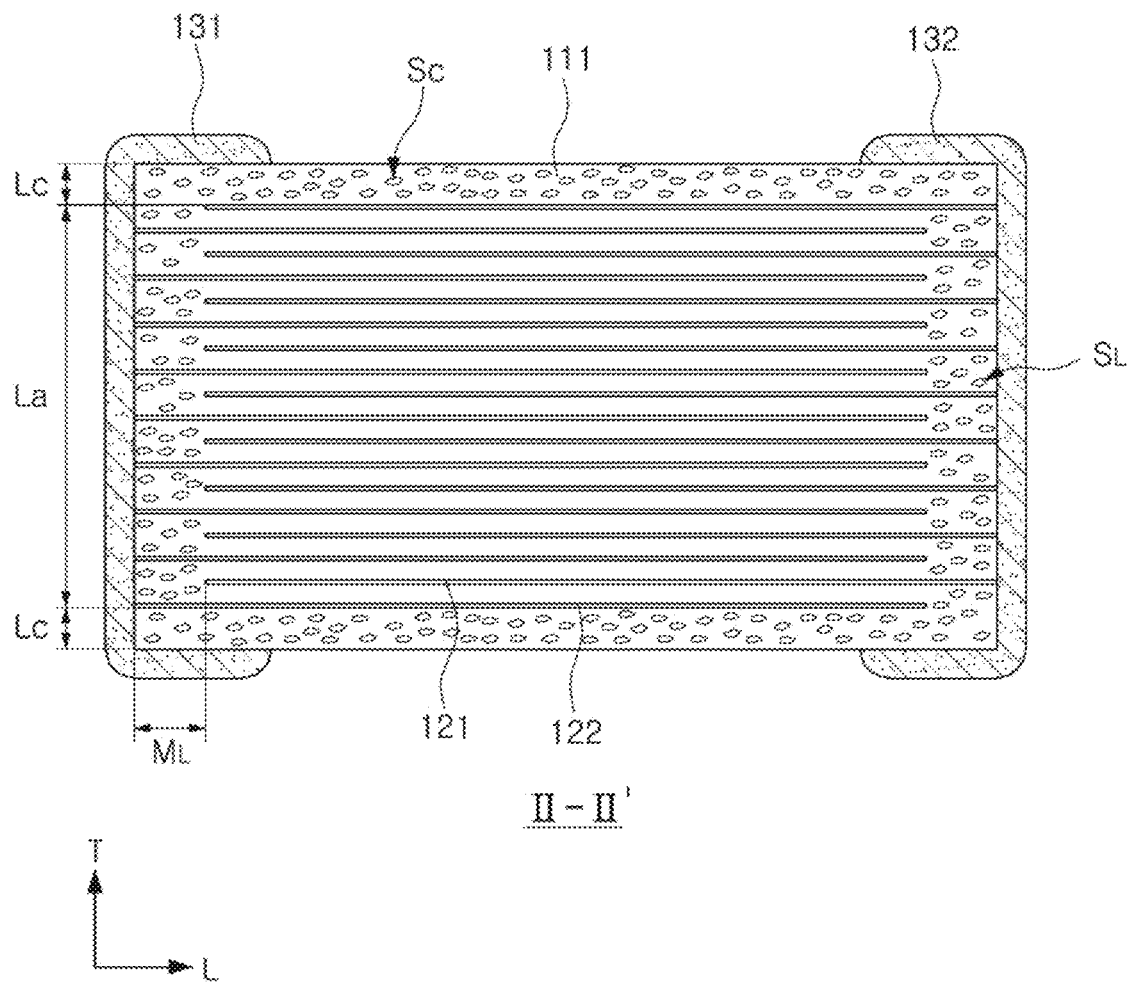
Figure 4F:
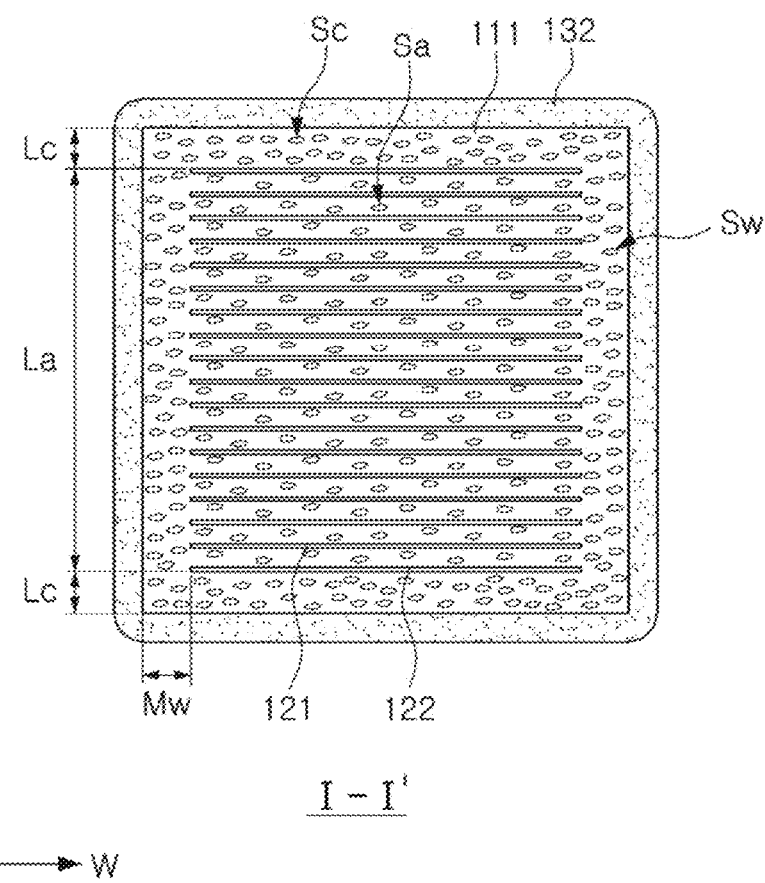

FIGS. 4B, 4D and 4F are sectional views taken along the line I-I' of FIG. 4A, and FIGS. 4C, 4E and 4G are sectional views taken along the line II-II' of FIG. 4A.

Referring to FIGS. 4A and 4B, the ceramic body 110 includes an area of overlap La in the thickness direction of the first and second internal electrodes 121 and 122, and margin regions Mw in the width direction, located on one side and the other side in the width direction of the area of overlap La.

The margin region Mw in the width direction may include a phosphoric acid-based second phase Sw. For example, the margin region Mw in the width direction may have a short length in the width direction like 10 μm or less. When the length of the width direction of the margin region Mw in the width direction is short, a ratio of the area of overlap La to the ceramic body 110 may be increased, so the capacitance of the ceramic body 110 may be increased.

When the length in the width direction of the margin region Mw in the width direction is short, the moistureproof reliability and hardness of the margin region Mw in the width direction may generally deteriorate. However, the multilayer ceramic electronic component according to the exemplary embodiment of the present disclosure includes the margin region Mw in the width direction including the phosphoric acid-based second phase Sw, such that even if the length in the width direction of the margin region Mw in the width direction is short, the moistureproof reliability and hardness may be prevented from deteriorating.

The phosphoric acid-based second phase Sw may be physically crossed to adjacent phosphoric acid-based second phases to be physically linked to the adjacent phosphoric acid-based second phases. Accordingly, the ceramic body 110 may withstand external physical impacts well, and a moisture infiltration path into the ceramic body 110 may be blocked.

In addition, the phosphoric acid-based second phase Sw may improve a grain density of the ceramic body 110 according to the low-temperature chemical sintering effect of the phosphoric acid type. Accordingly, the ceramic body 110 may withstand external physical impacts well, and the moisture infiltration path into the ceramic body 110 may be blocked.

That is, the phosphoric acid-based second phase Sw may relatively more improve the moistureproof reliability and hardness of the ceramic body 110 than other second phases.

The phosphoric acid-based second phase Sw may have an acicular shape or a rhomboid shape having a major axis D1 and a minor axis D2. The phosphoric acid-based second phase Sw may greatly improve the moistureproof reliability and hardness of the ceramic body 110 when the length of the major axis D1 is 0.5 μm or more and 2 μm or less.

For example, the length of the major axis D1 of the phosphoric acid-based second phase Sw may be adjusted by adjusting an oxygen partial pressure at the time of forming the ceramic body 110, but is not limited thereto. For example, the length of the major axis D1 of the phosphoric acid-based second phase Sw may be adjusted by adjusting a content of P, depending on how much a content of additive elements such as Ba and Si is and/or adjusting a content of the additive elements.

The phosphoric acid-based second phase Sw may further include Ba and Si, in which Ba and Si can improve control reliability of the length of the major axis D1 of the phosphoric acid-based second phase Sw and/or a distribution ratio of the phosphoric acid-based second phase Sw. The distribution ratio of the phosphoric acid-based second phase can refer to a number of phosphoric acid-based second phases in one unit volume.

The ceramic body 110 may include a cover region Lc located on one side and the other side in the thickness direction of the area of overlap La.

Referring to FIG. 4C, the cover region Lc may include the phosphoric acid-based second phase Sc. For example, the cover region Lc may have a short length in the thickness direction like 20 μm or less. When the length of the thickness direction of the cover region Lc is short, a ratio of the area of overlap La to the ceramic body 110 may be increased, so the capacitance of the ceramic body 110 may be increased.

When a length in a thickness direction of the cover region Lc is short, the moistureproof reliability and the hardness of the cover region Lc may generally deteriorate. However, the multilayer ceramic electronic component according to the exemplary embodiment of the present disclosure includes the cover region Lc including the phosphoric acid-based second phase Sc, such that even if the length in the thickness direction of the cover region Lc is short, the moistureproof reliability and hardness may be prevented from deteriorating.

The improvement principle of the moistureproof reliability and hardness, the length of the major length, and the additive elements of the phosphoric acid-based second phase Sc included in the cover region Lc may be similar to those of the phosphoric acid-based second phase Sw included in the margin region Mw in the width direction.

Referring to FIGS. 4D and 4E, the ceramic body 110 includes the margin region Mw in the width direction including the phosphoric acid-based second phase Sw, the cover region Lc including the phosphoric acid-based second phase Sc, and a margin region $M_L$ in the length direction. In the margin region $M_L$ in the length direction, only the first internal electrodes 121 or only the second internal electrodes 122 overlap with each other. The margin region $M_L$ may include the phosphoric acid-based second phase $S_L$, such that even if the length of the margin region $M_L$ is relatively short, the moistureproof reliability and hardness may not be deteriorated.

Accordingly, the moistureproof resistance reliability and hardness of the ceramic body 110 may be further improved.

Figure 4G:
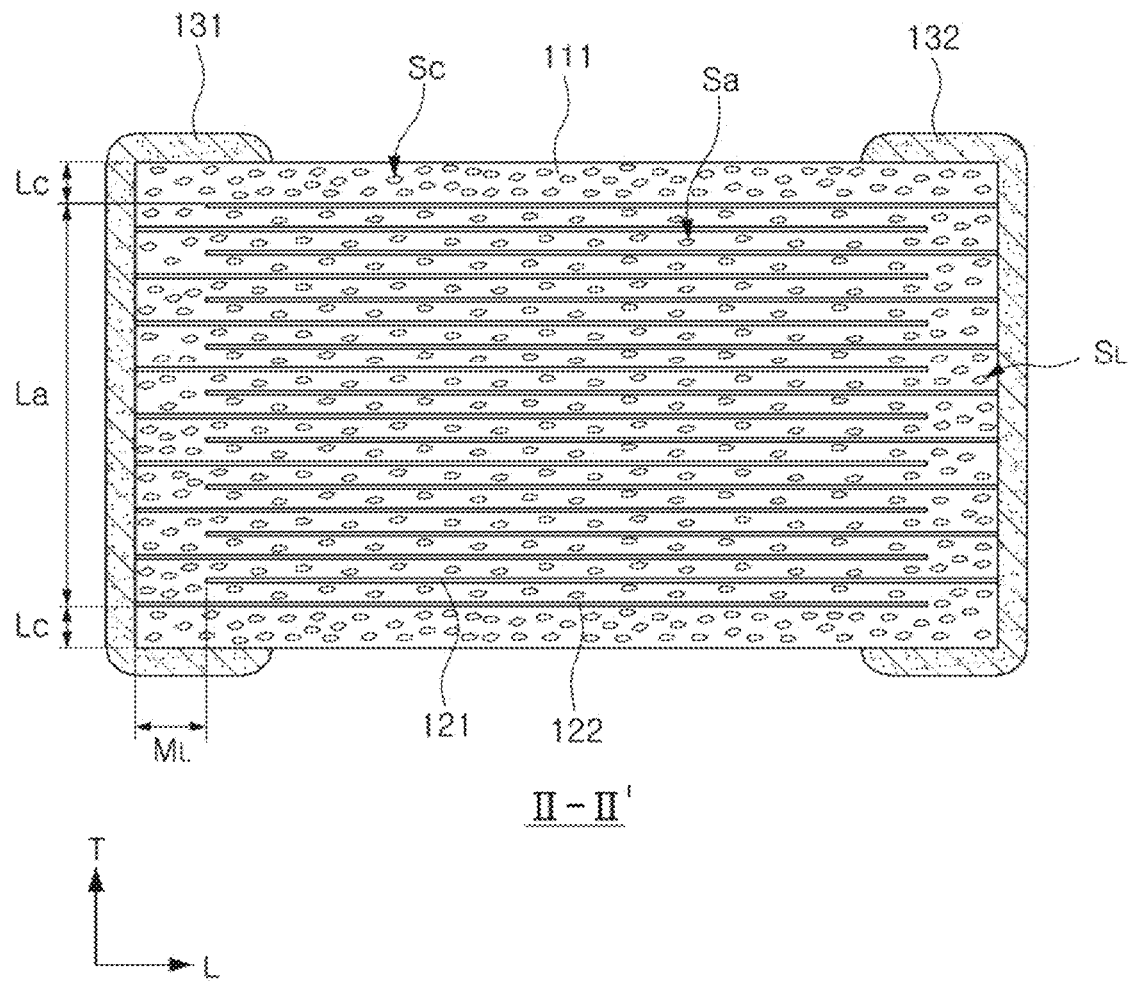

Referring to FIGS. 4F and 4G, the distribution ratio of the phosphoric acid-based second phase of the margin region Mw in the width direction, and/or the distribution ratio of the phosphoric acid-based second phase of the cover region Lc in the thickness direction is larger than that of the phosphoric acid-based second phase of the area of overlap La, and/or the distribution ratio of the phosphoric acid-based second phase of the margin region $M_L$ in the length direction is larger than that of the phosphoric acid-based second phase of the area in which the first and second internal electrodes 121 and 122 overlap with each other.

Accordingly, the improvement ratio of the moistureproof reliability and hardness against costs for forming the phosphoric acid-based second phase of the ceramic body 110 may be further increased.

Meanwhile, the thickness of the first and second external electrodes 131 and 132 may be as short as 20 μm or less. As a result, the multilayer ceramic electronic component may be miniaturized, and the manufacturing costs of the multilayer ceramic electronic component may be reduced.

When the thickness of the first and second external electrodes 131 and 132 is short, the moistureproof reliability and hardness of the ceramic body 110 may generally deteriorate. However, the ceramic body 110 includes the phosphoric acid-based second phase, such that even if the thickness of the first and second external electrodes 131 and 132 is short, the moistureproof reliability and hardness may be prevented from deteriorating.

Figure 5:
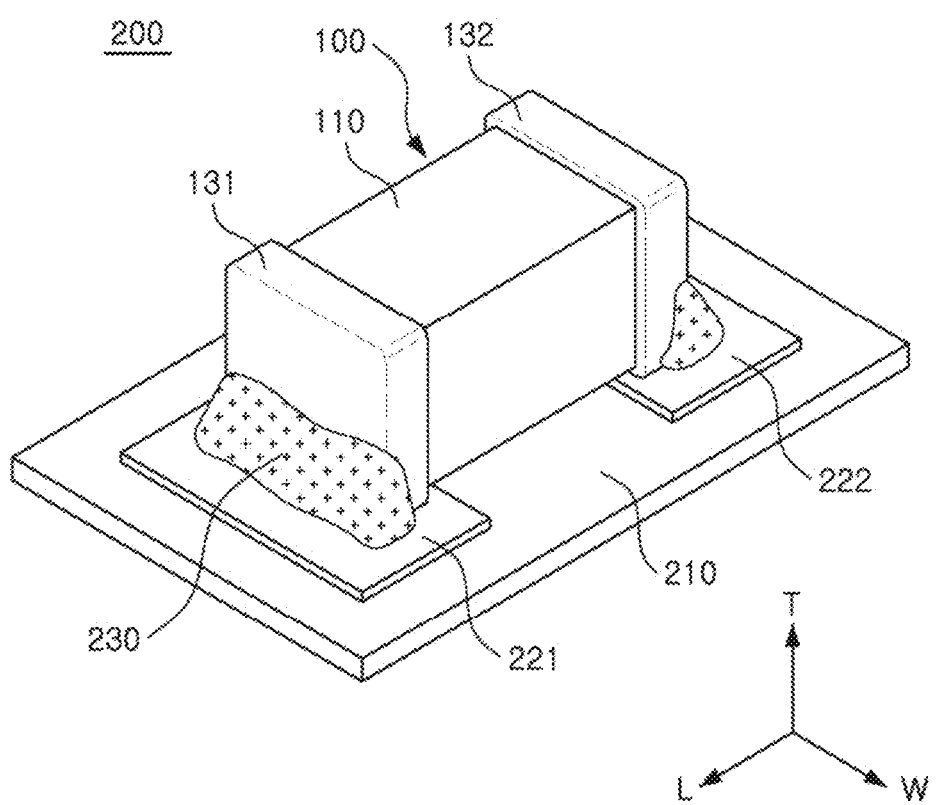
FIG. 5 is a perspective view showing a mounting form of the multilayer ceramic electronic component according to the exemplary embodiment of the present disclosure.

FIG. 5 is a perspective view showing a mounting form of a multilayer ceramic electronic component according to the exemplary embodiment of the present disclosure.

Referring to FIG. 5, the multilayer ceramic electronic component 100 according to the embodiment of the present disclosure may be electrically connected to a substrate 210, including first and second solders 230 connected to the first and second external electrodes 131 and 132, respectively.

For example, the substrate 210 may include first and second electrode pads 221 and 222, and the first and second solders 230 may be disposed on the first and second electrode pads 221 and 222, respectively.

If the corners of the ceramic body 110 are round, the first and second solders 230 may be stably connected to the first and second external electrodes 131 and 132 as the first and second solders 230 are filled in an extra space corresponding to the rounded corners of the ceramic body 110.

The first and second solders 230 may be further tightly coupled to the first and second external electrodes 131 and 132 according to a reflow process. The multilayer ceramic electronic component 100 according to the exemplary embodiment of the present disclosure may have the mounting reliability while having the relatively thin first and second external electrodes 131 and 132 to prevent the first and second solders 230 from being disconnected during the reflow.

Figure 6A:
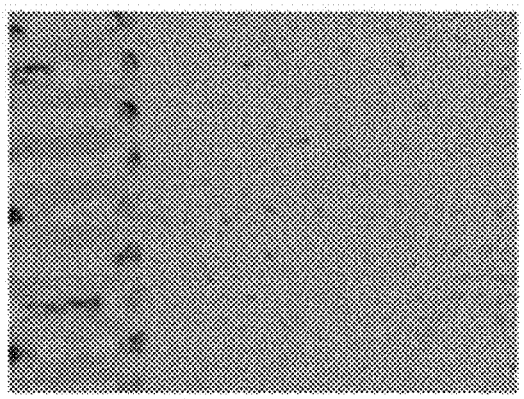
FIG. 6A is a scanning electron microscope (SEM) diagram showing a margin region in a width direction that does not include a phosphoric acid-based second phase.
Figure 6B:
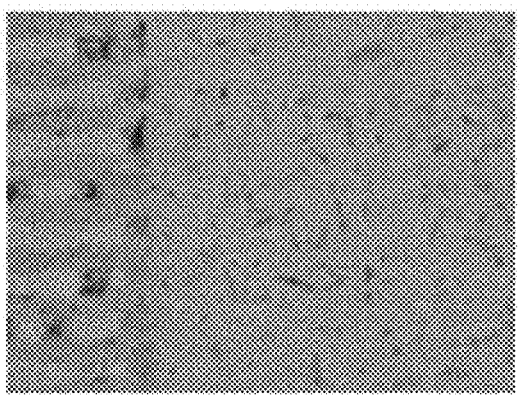
FIG. 6B is an SEM diagram showing the margin region in the width direction that includes the phosphoric acid-based second phase.
Figure 6C:
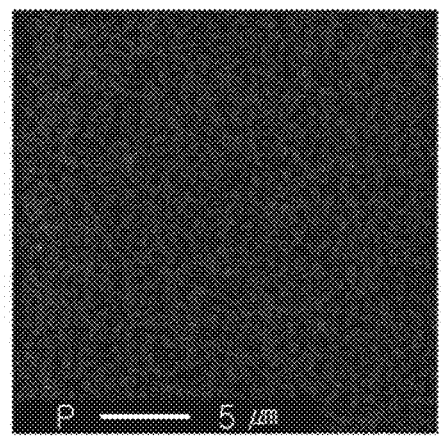
FIG. 6C is an electron probe microanalysis (EPMA) mapping diagram showing a cover region that does not include the phosphoric acid-based second phase.
Figure 6D:
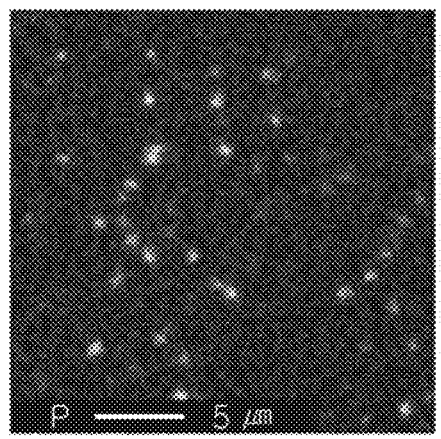
FIG. 6D is an EPMA mapping diagram showing a cover region that includes the phosphoric acid-based second phase.

FIG. 6A is a scanning electron microscope (SEM) diagram showing a margin region in a width direction that does not include a phosphoric acid-based second phase, FIG. 6B is an SEM diagram showing the margin region in the width direction that includes the phosphoric acid-based second phase, FIG. 6C is an electron probe microanalysis (EPMA) mapping diagram showing a cover region that does not include the phosphoric acid-based second phase, and FIG. 6D is an EPMA mapping diagram showing a cover region that includes the phosphoric acid-based second phase.

Due to the phosphoric acid-based second phase in some regions in the ceramic body, for example, the margin region in the width direction according to FIG. 6B and the cover region according to FIG. 6D, the multilayer ceramic electronic component may improve moistureproof reliability and hardness, as compared to the examples shown in FIGS. 6A and 6C, respectively.

As set forth above, according to an exemplary embodiment of the present disclosure, the multilayer ceramic electronic component may improve moistureproof reliability and hardness depending on the physical crosslinking effect of the phosphoric acid-based second phase and the low-temperature chemical sintering effect of a phosphoric acid type by including the phosphoric acid-based second phase in the region (margin region and/or cover region in the width direction) closer to the outside than the internal electrode in the ceramic body.

While exemplary embodiments have been shown and described above, it will be apparent to those skilled in the art that modifications and variations could be made without departing from the scope of the present invention as defined by the appended claims.

What is claimed is:
1. A multilayer ceramic electronic component, comprising:
a ceramic body including a dielectric layer and first and second internal electrodes stacked to be alternately exposed from one end surface and another end surface in a length direction with the dielectric layer disposed therebetween; and
first and second external electrodes disposed on the one end surface and the another end surface of the ceramic body and connected to the first and second internal electrodes, respectively,
wherein the ceramic body includes an area of overlap in a thickness direction of the first and second internal electrodes, and margin regions disposed on one side and another side in a width direction of the area of overlap, respectively, the margin regions in the width direction include a phosphoric acid-based second phase, and a major axis of the phosphoric acid-based second phase is 0.5 μm or more and 2 μm or less.

2. The multilayer ceramic electronic component of claim 1, wherein the margin regions in the width direction have a length in the width direction of 10 μm or less.

3. The multilayer ceramic electronic component of claim 1, wherein the phosphoric acid-based second phase includes Ba and Si.

4. The multilayer ceramic electronic component of claim 1, wherein an average thickness of the dielectric layer disposed between the first and second internal electrodes is 0.4 μm or less, an average thickness of each of the first and second internal electrodes is 0.4 μm or less, and the number of layers of the first and second internal electrodes is 400 layers or more.

5. The multilayer ceramic electronic component of claim 1, wherein a distribution ratio of the phosphoric acid-based second phase of the margin regions in the width direction is larger than that of another phosphoric acid-based second phase of the area of overlap.

6. The multilayer ceramic electronic component of claim 1, wherein the ceramic body further includes cover regions located on an upper side and a lower side of the area of overlap in the thickness direction, and the cover regions include the phosphoric acid-based second phase.

7. The multilayer ceramic electronic component of claim 6, wherein each of the cover regions has a thickness of 20 μm or less and is thicker than the first and second external electrodes, respectively.

8. The multilayer ceramic electronic component of claim 1, wherein the phosphoric acid-based second phase is physically linked to another phosphoric acid-based second phase.

9. A multilayer ceramic electronic component, comprising:

a ceramic body including a dielectric layer and first and second internal electrodes stacked to be alternately exposed from one end surface and another end surface in a length direction with the dielectric layer disposed therebetween; and first and second external electrodes disposed on the one end surface and the another end surface of the ceramic body and connected to the first and second internal electrodes, respectively, wherein the ceramic body includes an area of overlap in a thickness direction of the first and second internal electrodes and cover regions located on one side and the other side of the area of overlap in the thickness direction, the cover regions include a phosphoric acid-based second phase, and a major axis of the phosphoric acid-based second phase is 0.5 μm or more and 2 μm or less.

10. The multilayer ceramic electronic component of claim 9, wherein each of the cover regions has a thickness of 20 μm or less.

11. The multilayer ceramic electronic component of claim 9, wherein the phosphoric acid-based second phase includes Ba and Si.

12. The multilayer ceramic electronic component of claim 9, wherein a distribution ratio of the phosphoric acid-based second phase of the cover regions is larger than that of another phosphoric acid-based second phase of the area of overlap.

13. The multilayer ceramic electronic component of claim 9, wherein an average thickness of the dielectric layer disposed between the first and second internal electrodes is 0.4 μm or less, an average thickness of each of the first and second internal electrodes is 0.4 μm or less, and the number of layers of the first and second internal electrodes is 400 layers or more.

14. The multilayer ceramic electronic component of claim 9, wherein the phosphoric acid-based second phase is physically linked to another phosphoric acid-based second phase.

* * * * *